Nov. 7, 1961 R. W. CLARK 3,008,058

LOGICAL ELEMENT WITH SHUNT CONNECTED IMPEDANCE CHANGING SWITCHING MEANS

Filed Aug. 24, 1959

INVENTOR
ROBERT W. CLARK

BY Lorys A. Kline
Richard G. Stahr
HIS ATTORNEYS 3,008,058
Patented Nov. 7, 1961

3,008,058

LOGICAL ELEMENT WITH SHUNT CONNECTED IMPEDANCE CHANGING SWITCHING MEANS

Robert W. Clark, Centerville, Ohio, assignor to The National Cash Register Company, Dayton, Ohio, a corporation of Maryland Filed Aug. 24, 1959, Ser. No. 835,501
6 Claims. (Cl. 307—88.5)

The present invention relates to logical elements and, more specifically, to a logical switching element which may be selectively rendered conductive to an electrical signal.

In digital data translation equipment, it is frequently necessary to provide for the passage of electrical signal energy through certain elements only during selected intervals or during the coincident presence of two or more signals. In prior art devices, solid state elements have generally been employed in gating circuits for this application. While these types of gating circuits have been satisfactory, the limited current-carrying capacity of certain solid state elements has proven to be disadvantageous.

With low impedance sources of electrical signal energy, current is limited by the connected load rather than by the signal source, as is the case with high impedance sources. To use certain solid state elements with low impedance signal sources therefor, it has heretofore been necessary to include power-consuming load resistors for the purpose of limiting the current within the ratings of the elements employed. To eliminate the power-consuming load resistors with low impedance sources, the requirement of a logical switching element which may accommodate relatively high current flow is apparent.

It is, therefore, an object of this invention to provide an improved logical switching element.

It is another object of this invention to provide an improved logical switching element which may be used with low impedance signal sources without load resistor elements.

It is a further object of this invention to provide an improved logical switching element which may be selectively rendered conductive to an electrical signal produced by a low impedance source.

In accordance with this invention, a uni-directional current translating device of the type which possesses impedance characteristics which are a function of bias potentials applied thereto is connected in series with either one of first and second inductively coupled impedance elements in such a manner that the potential produced by electrical signal energy flow through the impedance element is applied as a reverse bias potential to the device, while a switching circuit is connected in shunt across the other impedance element, whereby the impedance of the first impedance element may be substantially reduced upon the closing of the switching circuit.

Figure 1:
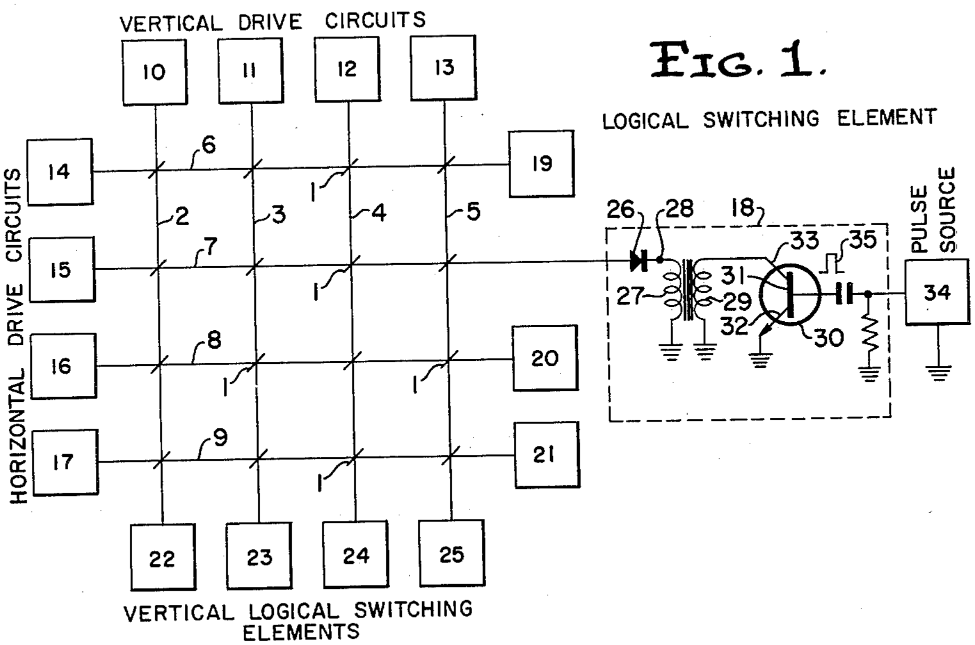
Figure 2:
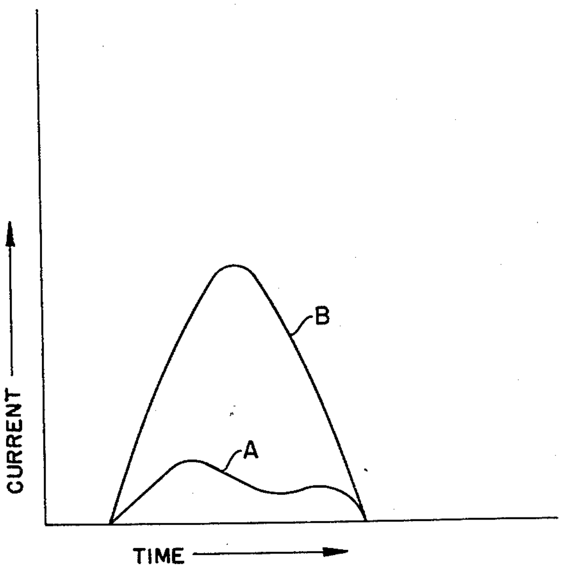

For a better understanding of the present invention, together with further objects, advantages, and features thereof, reference is made to the following description and the accompanying drawing, in which:

FIGURE 1 is a schematic circuit diagram of a preferred embodiment of the present invention; and FIGURE 2 diagrammatically illustrates current curves which may be useful in understanding the preferred embodiment.

Without intention or inference of a limitation thereto, a preferred embodiment of the present invention will be described in relation to an application thereof in the selection lines of a conventional magnetic core matrix. However, it is to be specifically understood that the principles of this invention may be applied to other digital data translating elements.

In FIGURE 1 there is diagrammatically illustrated a conventional matrix of magnetic cores, typically illustrated as short diagonal lines and identified generally by reference numeral 1, arranged in four columns and four rows. The vertical selection lines are illustrated by reference numerals 2, 3, 4, and 5, while the horizontal selection lines are indicated by reference numerals 6, 7, 8, and 9. Associated with one end of each of the vertical and horizontal selection lines is a conventional low impedance driver circuit. As these driver circuits may be any of several well known in the art and the details form no part of this invention, they have herein been illustrated in block form by reference numerals 10, 11, 12, and 13, for the vertical selection lines, and 14, 15, 16, and 17, for the horizontal selection lines.

At the other end of each horizontal and vertical selection line is a logical switching element of the present invention, detailed within the dashed-line rectangle 18. This element is associated with horizontal selection line 7; however, in the interest of reducing drawing complexity, the logical switching elements of the present invention associated with horizontal selection lines 6, 8, and 9 have been illustrated in block form by reference numerals 19, 20, and 21, respectively, while those elements associated with vertical selection lines 2, 3, 4, and 5 have been illustrated in block form by reference numerals 22, 23, 24, and 25, respectively. With matrices having more or less columns and rows of magnetic cores, corresponding more or less low impedance drivers and logical switching elements of the present invention may be employed.

Normally, logical switching element 18 limits the current in line 7 to a magnitude less than the half current required to select a core; however, the impedance characteristics of the logical switching element circuitry may be modified by a signal to permit the passage of a select half-current through line 7 in a manner now to be explained.

A uni-directional current translating device, herein illustrated as a diode by reference numeral 26, is connected in series with an inductive impedance element 27. Uni-directional current translation devices of this type possess impedance characteristics which are a function of bias potentials applied thereto. That is, a positive potential of increasing magnitude present at point 28 will proportionately increase the impedance of diode 26.

Closely inductively coupled to impedance element 27 is a second inductive impedance element 29. Shunted across impedance element 29 is a switching device herein illustrated as a type NPN transistor 30, with the usual base 31, emitter 32, and collector 33 electrodes. As any low impedance switching device may be employed in this application, transistor 30 is illustrative only.

With this arrangement, the impedance of element 27 may be represented by the formula $$Z_{27}=Z_{29}\left(\frac{N_{27}}{N_{29}}\right)^2$$

That is, the impedance of element 27, $Z_{27}$, is equal to the impedance of element 29, $Z_{29}$, multiplied by the square of the turns ratio of element 27 to element 29

$$\left(\frac{N_{27}}{N_{29}}\right)^2$$

While the switch which shunts element 29 is open, in this instance the open switch being represented by transistor 30 not conducting, the impedance of element 29 and, therefore, the impedance of element 27 are high.

As driver circuit 15 energizes selection line 7 with a signal energy under these conditions, diode 26 will begin conduction with the leading edge of the signal energy pulse, as illustrated by curve A of FIGURE 2. This current flow, however, results in a potential across the relatively high impedance of element 27, which is positive at point 28 and of a magnitude as determined by the impedance of element 27 and the amount of current flowing therethrough. As this potential is applied to diode 26 as a reverse bias potential, the impedance of diode 26 is increased, which, in addition to the high impedance of element 27, limits the current flow through line 7, in the present embodiment, to a magnitude less than the half-current required in coincidence with a similar half-current in one of the vertical selection lines, to switch a core.

To selectively render the element of this invention conductive, the switching device, transistor 30, which shunts element 29, is triggered. This may be effected through a circuit which supplies a positive potential pulse to the base 31 thereof. As this positive potential pulse source may be any one of several well known in the art and the details form no part of this invention, it has herein been illustrated in block form by reference numeral 34. In the present embodiment, of course, each of logical switching elements 19, 20, 21, 22, 23, 24, and 25 is supplied with a similar, respective positive potential pulse source. As driver 15 energizes line 7, the initial current flow through element 27, as shown by curve A of FIGURE 2, results in an induced potential in element 29, which is arranged to be positive at the end connected to collector 33 of transistor 30. Should pulse source 34 supply a positive potential pulse 35 to the base 31 of transistor 30 coincident with the energization of line 7, the base 31 of transistor 30 would be positive in respect to the emitter 32 thereof, and the collector 33 would be biased positive, a condition which satisfies the bias requirements for conduction through a type NPN transistor.

Upon the occurrence of these coincident signals, therefore, the switching element, transistor 30 in this instance, shunting element 29 is closed, placing a virtual short circuit across element 29. At this time, therefore, the impedance of element 29 is very low, being substantially equal to the ohmic value of the windings thereof. By arranging for the turns ratio of element 27 to element 29

$$\left(\frac{N_{27}}{N_{29}}\right)$$

to be less than unity, the impedance of element 27 may be reduced to a very low value upon the closing of the shunt switching device. Under these conditions, the current flow through the reduced impedance of element 27, as line 7 is energized, results in a potential drop thereacross which is not of a sufficient magnitude, in relation to the potential of driver 15, to substantially affect the impedance of diode 26. Therefore, the current flow through line 7 generally follows curve B of FIGURE 2 because of the reduced impedance of both diode 26 and element 27. In the preferred embodiment, it is necessary that the magnitude of the current at this time be less than the current required to switch a core, in that the selected core is determined by the intersection of coincidentally energized horizontal and vertical selection lines.

Although specific polarities have been recited in the description of the operation of the logical switching element of this invention, it is to be specifically understood that these polarities may be reversed without affecting the end result.

While a preferred embodiment of the present invention has been shown and described, it will be obvious to tnose skilled in the art that various modifications and substitutions may be made without departing from the spirit of the invention, which is to be limited only within the scope of the appended claims.

What is claimed is:

1. A logical switching element which may be selectively rendered conductive to an electrical signal, comprising a uni-directional current translating device of the type which possesses impedance characteristics which are a function of bias potentials applied thereto, first and second inductively coupled impedance elements, means for connecting said device in series with said first impedance element whereby the potential produced by electrical signal energy flow through said first element is applied as a reverse bias potential to said device, and switching circuit means connected directly in shunt across said second impedance element whereby the impedance of said first impedance element may be substantially reduced upon the closing of said switching circuit means.

2. A logical switching element which may be selectively rendered conductive to an electrical signal, comprising a diode device which possesses impedance characteristics which are a function of bias potentials applied thereto, first and second inductively coupled impedance elements, means for connecting said diode device in series with said first impedance element whereby the potential produced by electrical signal energy flow through said first element is applied as a reverse bias potential to said diode device, and switching circuit means connected directly in shunt across said second impedance element whereby the impedance of said first impedance element may be substantially reduced upon the closing of said switching circuit means.

3. A logical switching element which may be selectively rendered conductive to an electrical signal, comprising a uni-directional current translating device of the type which possesses impedance characteristics which are a function of bias potentials applied thereto, first and second inductively coupled impedance elements, means for connecting said device in series with said first impedance element whereby the potential produced by electrical signal energy flow through said first element is applied as a reverse bias potential to said device, and transistor switching circuit means connected directly in shunt across said second impedance element whereby the impedance of said first impedance element may be substantially reduced upon the closing of said switching circuit means.

4. A logical switching element which may be selectively rendered conductive to an electrical signal, comprising a work circuit, a diode device which possesses impedance characteristics which are a function of bias potentials applied thereto, first and second inductively coupled impedance elements, means for connecting said diode device in series with said work circuit and said first impedance element whereby the potential produced by electrical signal energy flow through said first element is applied as a reverse bias potential to said diode device, and transistor switching circuit means connected directly in shunt across said second impedance element whereby the impedance of said first impedance element may be substantially reduced upon the closing of said switching circuit means.

5. A logical switching element which may be selectively rendered conductive to an electrical signal, comprising a uni-directional current translating device of the type which possesses impedance characteristics which are a function of bias potentials applied thereto, a transformer having primary and secondary windings, means for connecting said device in series with the primary windings of said transformer whereby the potential produced by electrical signal energy flow through said primary windings is applied as a reverse bias potential to said device, and switching circuit means connected directly in shunt across the secondary windings of said transformer whereby the impedance of said primary windings may be substantially reduced upon the closing of said switching circuit means.

6. A logical switching element which may be selectively rendered conductive to an electrical signal, comprising a work circuit, a diode device which possesses impedance characteristics which are a function of bias potentials applied thereto, a transformer having primary and secondary windings, means for connecting said diode device in series with the work circuit and the primary windings of said transformer whereby the potential produced by electrical signal energy flow through said primary windings is applied as a reverse bias potential to said diode device, and switching circuit means connected directly in shunt across the secondary windings of said transformer whereby the impedance of said primary windings may be substantially reduced upon the closing of said switching circuit means.

References Cited in the file of this patent

UNITED STATES PATENTS

| | | |
|---|---|---|
| 2,866,178 | Lo | Dec. 23, 1958 |
| 2,902,609 | Ostroff | Sept. 1, 1959 |
| 2,920,213 | Elias | Jan. 5, 1960 |

OTHER REFERENCES

"Digital Computer Components and Circuit," by Richards, published by Van Nostrand, Princeton, New Jersey, November 1957, page 192.